(12) United States Patent
Conley (10) Patent No.: US 7,948,681 B2
(45) Date of Patent: May 24, 2011

(54) DEVICE FOR DISPLAYING A THREE DIMENSIONAL IMAGE

(76) Inventor: Kenneth E. Conley, Matthews, NC (US)

( * ) Notice: Subject to any disclaimer, the term of this patent is extended or adjusted under 35 U.S.C. 154(b) by 102 days.

(21) Appl. No.: 12/386,860

(22) Filed: Apr. 24, 2009

(65) Prior Publication Data

US 2009/0213210 A1 Aug. 27, 2009

Related U.S. Application Data (63) Continuation-in-part of application No. 11/512,451, filed on Aug. 30, 2006, now Pat. No. 7,660,041.

(51) Int. Cl.
*G02B 27/10* (2006.01)
(52) U.S. Cl. .................. 359/619; 359/618
(58) Field of Classification Search .......... 359/619, 359/463, 630, 618, 626; 348/51, 59, 744; 345/4–9
See application file for complete search history.

(56) References Cited

U.S. PATENT DOCUMENTS

| | | | | |
|---|---|---|---|---|
| 4,130,337 | A * | 12/1978 | Okoshi | 359/23 |
| 5,493,427 | A * | 2/1996 | Nomura et al. | 349/5 |
| 5,640,273 | A | 6/1997 | Hamagishi et al. | 359/462 |
| 6,084,978 | A | 7/2000 | Taylor et al. | 382/154 |
| 6,229,561 | B1 * | 5/2001 | Son et al. | 348/42 |
| 6,396,472 | B1 | 5/2002 | Jacklin | 345/104 |
| 6,760,021 | B1 | 7/2004 | Karszes et al. | 345/419 |
| 6,995,914 | B1 | 2/2006 | Conley et al. | 359/619 |
| 7,154,642 | B2 | 12/2006 | Lichtfuss | 359/497 |
| 7,495,634 | B2 * | 2/2009 | Takagi et al. | 345/6 |
| 7,639,838 | B2 * | 12/2009 | Nims | 382/103 |
| 2005/0195276 | A1 | 9/2005 | Lipton et al. | |
| 2006/0023197 | A1 | 2/2006 | Joel | |
| 2007/0201133 | A1 | 8/2007 | Cossairt | |
| 2008/0218855 | A1 | 9/2008 | Van Berkel | |
| 2008/0273242 | A1 | 11/2008 | Woodgate et al. | |
| 2009/0116108 | A1 | 5/2009 | Levecq et al. | |
| 2009/0213210 | A1 | 8/2009 | Conley | |

OTHER PUBLICATIONS

Van Berkel, CEES, Image Preparation for 3D-LCD, IS&T/SPIE Conference on Stereoscopic Displays and Applications X, San Jose, California, Jan. 1999, pp. 84-91, SPIE vol. 3839.

* cited by examiner

*Primary Examiner* — Mohammed Hasan
(74) *Attorney, Agent, or Firm* — Jason S. Miller; Lowndes, Drosdick Doster, Kantor & Reed, P.A.

(57) ABSTRACT

A digital display system is disclosed, wherein the display system generally includes a recording mechanism, such as a digital camera, a processing mechanism for processing and saving at least one image; software for interlacing the image; software for processing slides and movies comprised of multiple images; a digital display device for receiving, storing and displaying the image, and a lenticular screen overlaid upon the digital display device for viewing the interlaced images in three dimensions. A method of manufacturing a lenticular sheet is also disclosed as having as its primary steps the provision of a substantially transparent substrate material; forming a plurality of lenses on a first side of the substrate; and shaping the substrate to correspond to a display area of the display device, wherein the plurality of lenses are angled to correspond to the pixel size and pitch of the display area.

16 Claims, 5 Drawing Sheets

DEVICE FOR DISPLAYING A THREE DIMENSIONAL IMAGE

CROSS-REFERENCE TO RELATED APPLICATION(S)

This application is a continuation-in-part of U.S. patent application Ser. No. 11/512,451, filed Aug. 30, 2006 now U.S. Pat. No. 7,660,041 B1, and entitled "METHOD OF PRODUCING A SHEET HAVING LENTICULAR LENSES FOR A THREE DIMENSIONAL DISPLAY SYSTEM," the contents of which are incorporated in full by reference herein.

BACKGROUND OF THE INVENTION

1. Field of the Invention

The present invention relates generally to digital display devices, and more particularly, to display devices having a digital picture frame format operable for displaying single or multiple three dimensional images.

2. Technical Background

Digital display devices, conventionally known as "digital picture frames" are well known in the art and are used to display two dimensional digital images. Conventional digital picture frames typically include a display screen which may, for example, be an LED or LCD type display. The display screen is generally mounted within a housing having a picture frame type format. In other words, the housing may have a configuration similar to that of a conventional picture frame commonly used to hold and display photographs. The housing of a digital picture frame, in a manner similar to a conventional picture frame, generally includes a stand or mounting mechanism to either allow the digital picture frame to be placed upright on a desk or table or mounted to a wall or other structure so as to facilitate display of the image appearing thereon.

Conventional digital picture frame devices typically include an internal memory apparatus for storing one or more images to be displayed by the device. One or more user interface buttons may also be provided in order to allow a user to select which image stored in memory is to be displayed. In some devices, a user may also choose to have various images that are stored in memory sequentially displayed on the device over selected time intervals. A digital picture frame device also typically includes a power source. In some devices, the power source allows the device to be connected to a standard home electrical power outlet in order to supply power to the device.

Images may be transferred to digital picture frame devices in various manners. In one type of digital picture frame device, a connection may be made to a conventional telephone line. Digital image files may then be downloaded to the device via the Internet. Accordingly, to download images to this type of digital picture frame, the images must first be uploaded to an Internet site. In another type of digital picture frame device, images may be transferred to the device via memory cards, such as those useable in conjunction with many digital cameras, or from a personal computer via a cable. Accordingly, to download images to this type of digital picture frame device, the images must first be uploaded to a personal computer or acquired by a digital camera device.

As can be appreciated from the above, conventional digital picture frame devices are only capable of displaying two dimensional digital images which have been digitized. Accordingly, if it is desired to display a three dimensional digital image of an object, conventional devices are insufficient. Various methods and devices for forming and displaying three dimensional images are known in the art. As is understood by those skilled in the art, the term "three dimensional," is an image of an object, or arrangement of objects, to have an appearance of height, width and depth. This contrasts with conventional photographs and unmodified digital format conversions of the same, which display the dimensions of height and width but, for reasons including lack of parallax, do not display a true image of depth. Such images are known as two dimensional images.

With the increase in popularity of digital photo frames it has become increasingly desirable to produce and display three dimensional images through the frames. Various methods and systems are known in the art which overlay a lenticular lens on a display screen such that a two demensional image being displayed on the device will appear to have a three demensional effect. Unfortunately, the known methods systems suffer several shortcomings. By way of example, known methods and systems have heretofore not provided an adequate manner of interlacing the images to accommodate for the pixel size and pitch of the specific monitor or screen upon which it is being projected. By way of another example, known methods and systems do not disclose a manner of producing a lenticular lens which produces a high clarity three demensional image at the viewing screen or monitor. Accordingly, there is a need in the art for a method of manufacture for a lenticular sheet such that the sheet, when produced, corresponds to the pixel size and pitch of the display device which the sheet is attached to. For such methods, is would be desirable to provide an improved three dimensional display system which includes a recording device, a computing device for interlacing recorded images, and a digital photo frame display device having a high clarity lenticular sheet removably, attached thereto.

SUMMARY OF THE INVENTION

To achieve the foregoing and other objects, and in accordance with the purposes of the invention as embodied and broadly described herein, the present invention provides various embodiments of a digital display device operable for displaying three dimensional digital images. The various embodiments disclosed herein also teach of a method for manufacturing a lenticular sheet operable for removable attachment to a digital display device of a three dimensional display system, such as a digital photo frame. To facilitate higher clarity in viewing the desired visual effects, the lenticular sheet of the present invention is preferably produced with a configuration that corresponds to the pixel size and pitch of the digital display device. Further, to facilitate higher clarity in viewing the desired visual effects, the lenticular sheet is provided with a lower viewing angle than that provided by conventional methods and systems such that the resolution of an image displayed on the digital display device is accommodated. In various embodiments, the method of producing a lenticular sheet having plurality of lenses located thereon and extending in an angled configuration is disclosed such that the lenticular sheet is operable for removable attachment to the digital display devices disclosed, such as a digital photo frame.

According to an exemplary embodiment, a digital display device having a lenticular sheet removably attached thereto is disclosed such that three dimensional digital images may be viewed. The digital display device generally includes a housing unit operable for housing a display unit for the displaying of digitally interlaced photographs and accompanying audio recordings. The display unit may comprise, in combination; means for receiving a removable non-volatile digital recording medium, means for selectively accessing and displaying data (digitally interlaced photographs and audio recordings) stored within said medium, means of transferring the data from the recording medium to the electronic device, and means for releasing said non-volatile digital recording medium. The display unit also includes a lenticular sheet removably attached thereto. The lenticular sheet corresponds to the pixel size and pitch of the display of the display unit such that the data displayed may be viewed in three dimensions.

According to yet a still further exemplary embodiment of the present invention, there is provided a digital photograph frame adapted for displaying a digital still photograph in three dimensions, said frame having top and bottom front and back sides, a translucent display screen contiguous with said frame and covering a displayed digital still photograph and through which a displayed picture is visible, a lenticular sheet removably attached to the display screen operable for allowing the digital photograph to be viewed in three dimensions, means for receiving a removable non-volatile digital recording medium, means for selectively accessing images and sound data arrayed within said means for advancing accessed images and sound data from at least first position to at least a second position, means for ejecting a removable non-volatile digital recording medium.

According to an alternate exemplary embodiment of the present invention there is provided a process for displaying digital still photographs stored on a non-volatile digital storage medium comprising the steps of; powering up an electronic digital display frame system having a display screen and a lenticular sheet removably attached thereon, inserting a non-volatile digital storage medium into said electronic digital display frame system, accessing a first desired digital still photograph within said non-volatile digital storage medium, viewing a first desired digital still photograph, exchanging a first desired digital still photograph for a second desired digital still photograph; and, repeating said viewing step and exchanging step, wherein said accessing step may further comprise accessing an accompanying desired audio sequence.

A method of manufacture for a lenticular sheet and a three dimensional digital display system is also provided wherein the lenticular sheet is produced by the steps of obtaining predetermined values corresponding to the pixel size, resolution and pitch of a digital display device. Based upon these predetermined values, an image which has been recorded and interlaced is resized to correspond to the digital display device through the use of an interlacing and resizing software program of the type commonly available in the industry. Alternatively, an image is recorded and interlaced at a size corresponding to the display device. The image is resized by adjusting frequency to the pixel count of the LED or LCD display. Once interlaced, the image is stored in a memory device of the display device.

Thereafter, a cutting tool is formed and used to engrave a predetermined lens pattern into a metal plate at the desired area. The engraving of the plate is performed in any known conventional manner of engraving. However, it is preferable that a computer be utilized for directing the manner and depth of the cutting tool as it engraves the plate. The lens pattern, as engraved into the plate, is then polished to achieve an optimal optical surface. Thereafter, the lens pattern is transferred to a desired side of a flexible, transparent plastic sheet at a desired location by known casting methods of manufacture. Subsequent to the casting of the resulting lenticular sheet, the sheet is formed into a shape such that the size of the sheet corresponds to the dimensions of the digital display device and so that lenticules of the sheet are angled to correspond to the pixel size and pitch values of the digital display device.

The lenticular sheet is then removably attached to the digital display device such that the resized, interlaced two dimensional image may transmitted to the digital display device from a computing device or memory device and projected on the display device for viewing in three dimensions through the lenticular sheet.

Additional features and advantages of the invention are set forth in the detailed description which follows and will be readily apparent to those skilled in the art from that description, or will be readily recognized by practicing the invention as described in the detailed description, including the claims, and the appended drawings. It is also to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof. Additionally, the drawings and descriptions are meant to be merely illustrative and not limiting the intended scope of the claims in any manner.

BRIEF DESCRIPTION OF THE DRAWINGS

The foregoing and other objects, aspects, and advantages will be better understood from the following description of exemplary embodiments of the invention with reference to the drawings, in which.

DETAILED DESCRIPTION

Reference will now be made in detail to exemplary embodiments of the invention, which are illustrated in the accompanying drawings. Whenever possible, the same reference numerals will be used throughout the drawings to refer to the same or like parts. Further, as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The various embodiments of the present invention may be applied in any known lenticular manufacturing system. Further, the exemplary embodiments of the disclosed lenticular sheet and the method for making the same may be applied to any conventionally know digital photograph frame. As is well known and understood in the art, lenticular lens material utilizes rows of simple and commonly dome-shaped lenses or "lenticules" in combination with a lineform or interlaced image, to create the desired visual effect. As used herein, the term "lenticular sheet" is intended to include any optical sheet, roll, film or material that is suitable for use in the printing arts and has a substantially transparent quality. Material compositions of such sheets may include, for example and without limitation, polypropylene, polyester, polyethylene, polyvinylchloride, and polystyrene. All such compositions are considered to be polymeric sheet materials and are synonymous therewith. In one example, the lenticular sheet generally comprises a flat side and a lenticulated side including the lenticules.

Figure 1:
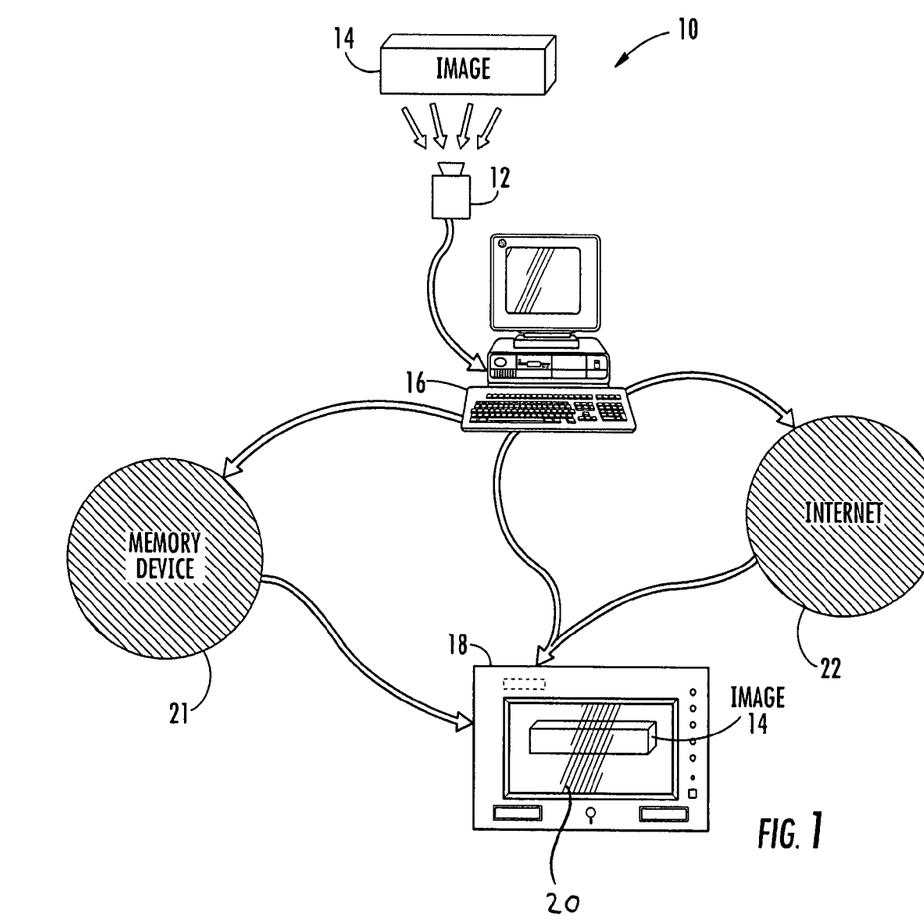
FIG. 1 is a diagrammatic view illustrating the various components of the lenticular system and method according to an exemplary embodiment of the present invention.

The present invention, in one exemplary embodiment, provides a method of manufacture for a lenticular sheet and a lenticular system for displaying three dimensional images or videos on a digital photograph display device in sequence. Referring now to FIG. 1, a diagrammatic view of a lenticular display system 10 according to an exemplary embodiment of the present invention is illustrated. As shown, the lenticular system 10 includes a recording device 12 operable for recording at least one image 14 and transmitting the image 14, a computing device 16 having software operable for receiving, processing and interlacing a plurality of images 14 transmitted from the recording device such that the plurality of images 14 are interlaced, a digital display device 18 for displaying the interlaced images 14, and a lenticular sheet 20 removably connected to the digital display device 18 such that the interlaced plurality of images 14 maybe viewed as a sequence of three dimensional images.

In some exemplary embodiments, the recording device 12 may be any single lens digital camera that is commercially available. In such cases, a user may utilize a "burst" feature of the digital camera to record or take a plurality of photographs in succession of a particular subject. Alternatively, the user may manually record a plurality of images of a subject at timed intervals. Thereafter, the plurality of images may be transmitted to a computing device having interlacing software thereon and interlaced into a single image. The resulting image would exhibit three dimensional effects when viewed through the device of the present invention. To achieve the best results at least three recorded exposures should be taken. In yet another exemplary embodiment, a digital camera may be provided and used wherein the digital camera which includes an interlacing feature preprogrammed into its memory. The interlacing feature may be similar to that of the interlacing software's readily available in the industry. In such a case, a user may be able to record a number of images of a desired subject and interlace the images into a single image. Thereafter, the interlaced image may be transmitted to the device of the present invention for viewing.

In other exemplary embodiments described herein, the computing device 16 may be any commercially available system with adequate power and memory to handle the interlacing and imaging processes. Further, the software of the computing device 16 is operable for processing predetermined information such as the type of image, the number of images, the display sequence of the images, and the pixel size and pitch and resolution of the display device. Still further, the software is operable for resizing the plurality of images 14 to correspond to the size of the digital display device 18 and the lenticular sheet 20 such that the quality of the viewed images is optimized. The digital display device 18 is preferably a digital photographic display device commonly referred to a "digital photo frame." However, it will be understood by those skilled in the art that the display device may be any commercial available device used for display photographic or video images including, computer monitors, LEDs, LCD's, CRT's, televisions, or the like. In exemplary embodiments, a display device 18 having a flat screen is used such that the lenticular sheet 20 may be easily attached to the surface thereof. By using the system of the present invention, the use of 3-D type glasses is obviated. Still further, by using the system of the present invention, a more efficient and higher clarity sequence of images is provided over conventional and known methods and systems.

In exemplary embodiments of the present invention, the image 14 is recorded and prepared by using conventional recording means including, for example, a digital camera device (not shown) having a single or multiple lens thereon for recording numerous views of the image 14, such that the image 14 can be interlaced to provide the illusion of depth. In preferred embodiments, the image 14 is prepared by combining or interlacing selected images on the computer device 16 such that the images 14 are produced in a manner ready for printing and/or viewing. The interlacing of the images 14 is preferably performed by a software application readily available in the industry. By way of example, a common program is "Flip" available from Kutuz, Inc. Alternatively, software applications such as Photoshop™, Corel Draw™ and others may be utilized. The images 14 are interlaced at a combining frequency equal to that of the lenticular sheet 20, such as commonly done for lenticular assemblies using printed images in combination with lenticular sheets. Previously interlaced images made for printing and combining to a lenticular sheet may be used in the present invention by resizing the images to match the frequency or "pitch" of the lenticular sheet that has been placed over the display device 18. For recorded images which have not been previously interlaced, they are interlaced such that the resulting product corresponds to the pixel pitch and size of the digital display device 18. Once interlaced, the images 14 are stored in the computing device 16 or on a memory device 21 such as a flash memory card or other related non-volatile digital recording medium. Once stored, the images 14 may be transmitted from the computing device 16 or the memory device 21 to the digital display device 18. In other exemplary embodiments, the images 14 may be transmitted through the Internet 22. If the images 14 are transmitted through the Internet 22, they will later be resized to correspond to the digital display device 18.

Figure 2:
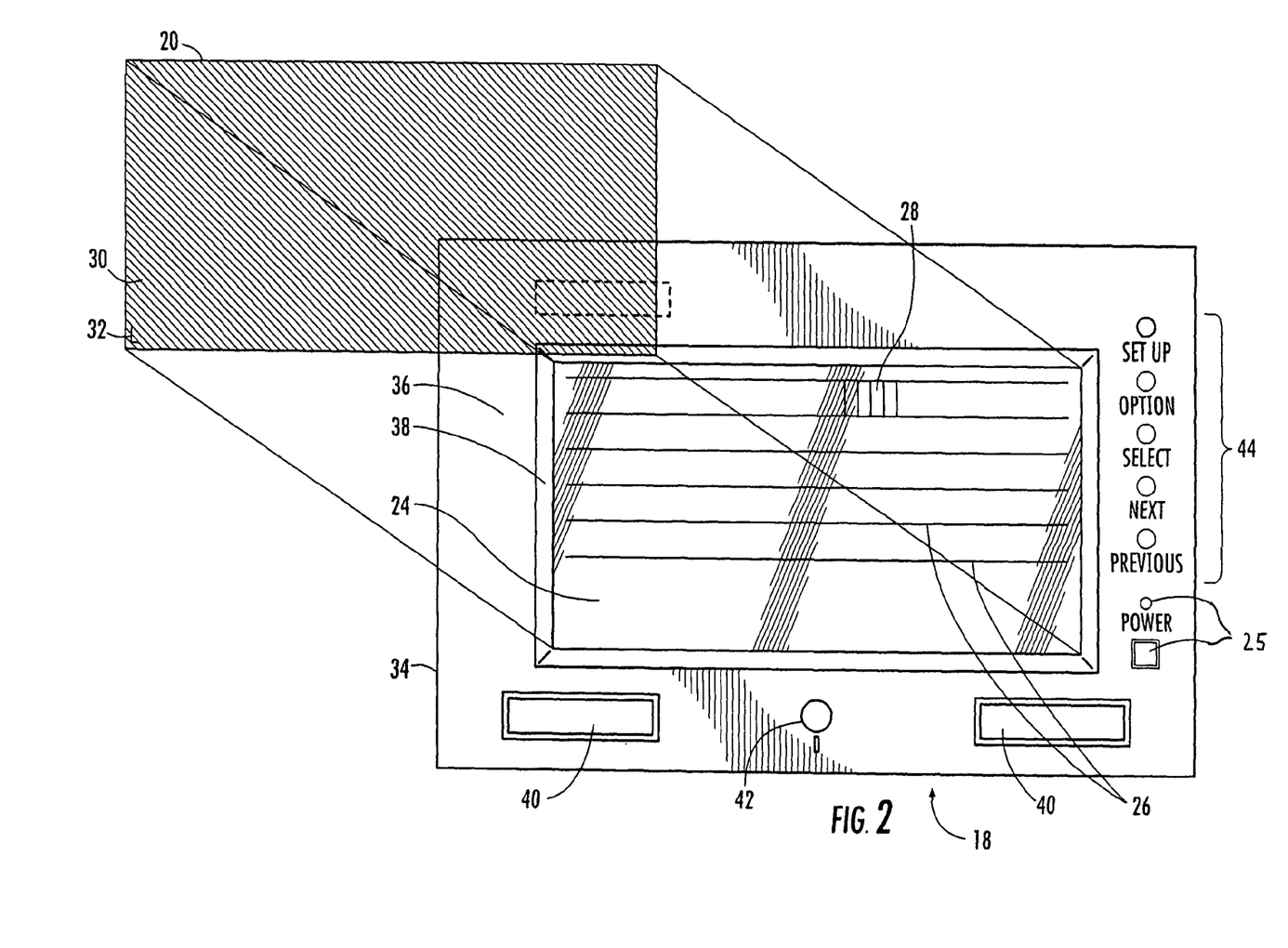
FIG. 2 is a diagrammatic view of a digital; display device with a lenticular sheet removably attached thereto constructed in accordance with an exemplary embodiment of the present invention.

Referring now to FIG. 2, a display area 24, which is part of the digital display device 18 is shown in greater detail. The display area 24 consists of a plurality of scan lines 26. Each scan line 26 consists of a set of precisely positioned pixels 28 each of which is comprised of individually colored sub-pixels. The lenticular sheet 20 with an array of slanted lenticules 30 is precisely, removably attached over the display area 24.

On any given scan line 26, a single lenticule 30 will cover a non-integer number of sub pixels. The optical properties of the lenticule causes the emitted light from these covered sub pixels to be refracted at different angles towards a viewer. This phenomena is repeated for all lenticules over all scan lines 26. The design of the lenticular sheet 20 including the lenticular pitch (lenticules per inch) and slant angle 32 (rotation of the lenticule to the vertical or traditional panoramagram orientation) is optimized such that the calculated interdigitation mapping of perspective views to sub pixels will allow a complete representation of each perspective view to be projected in space towards a viewer. The viewer will thus be able to observe different views in both eyes and perceive a perspective representation. By providing lenticular screen 20 having angled lenticules, a display system having a matched resolution in both the horizontal and vertical configuration can be achieved. This produces a three dimensional digital image that has superior clarity and brightness when compared to a traditional striped lenticular screen. Also, by providing a lenticular lens at a slant angle 32, higher clarity image may be viewed as a reduction in moiré and/or rainbow effects is produced. By way of example, for a display device having a display area of 49½ inches by 37½ inches, it has been found that the preferred pitch angle for lenticules of a 16.7 lpi, ½ inch thick lenticular sheet is 19.5 degrees. Further, for such a sheet, the preferred viewing angle is ≈16 degrees.

In exemplary embodiments, the display device 18 may comprise a housing unit 36, shown in a front view, wherein a multiplicity of electronic components and/or a printed circuit board (PCB) are housed internally. In exemplary embodiments, a plurality of indicators 25, user interface buttons 44 and connectors may be provided and disposed upon the outside of housing unit 36. It will be understood by those skilled in the art that the indicators 25 and the user interface buttons 44 and connectors may be provided and mounted upon the outside of the back or side portions of the housing unit 36 as opposed to the front, as depicted.

The housing unit 36 may include a recessed beveled frame 38 which is effective for surrounding the image 14. Advantageously, the configuration of the recessed beveled frame 38 is operable for focusing a user's attention, and for concentrating a user's eyes' optical focal point upon a central portion of a displayed image within recessed beveled frame 38. The display screen 24 allows a user to view any selected digital still photograph, in addition to displaying available operator selection options (or "setup menu"), when same has been selected by a user. Likewise, the display screen 24 may contain a manufacturer specific digital still photograph, or an advertising message during the power sequence. Operationally, the display screen 24 activates following a power on sequence when a subject digital still photograph, located at the first stored frame ("frame 1") on the digital film—or non-volatile storage medium, is displayed.

In some exemplary embodiments, stereophonic speakers 40 may be provided for producing accompanying audio information for a selected and displayed digital still photograph, when same has been made available and stored. A microphone 42 may also be provided for audio recording to accompany digital photographs from an alternate source. The microphone 42 is not operational during power on sequence, becoming operational following power on sequence. The stereophonic speakers 40 are silent during power up sequence, and then play associated audio recordings for frame 1, following completion of power on sequence.

In exemplary embodiments, various user interface buttons 44 may be included in the housing unit 36. The user interface buttons 44 may be provided such that a user can manually control the operation of the display device 18. Such user interface buttons and their respective operations are conventionally known and may include, "set up", "option", "menu", "next", "previous", and "select" buttons. Additionally, volume control buttons (not shown) may be included. In exemplary embodiments and by way of example only, the "setup" button may be operable for clearing a displayed image from the display screen 24 and thereafter causing a first setup screen to be displayed. Once activated, a user can manually program the operation of the display device 18 by using the other user interface buttons 44. Typically, the setup button is not operational during the power up sequence, however, it becomes operational after the power up sequence is complete. For yet another example, an "Option" button may also be provided for allowing a user to move to setup options displayed on the screen, selecting the one which is desired to be changed. This may involve photograph matting, cropping of photographs or exit setup functions as detailed below. For yet another example, a "Select" button may allow a user to move to detail configuration specifications displayed for selected options, such as for photograph matting—No matting, black, 50% black, and similar or related variations. Cycling features may also be provided via "next" and "previous" buttons. Such buttons would allow a user to run the manual means to display desired images, and to hear the associated audio sequences in accordance with the next highest or lowest frame number.

In exemplary embodiments, the setup features allow a user to program a desired sequence of display, or to have same done manually. To this end, "setup" button, "option" button, "select" button, "next" button and "previous" button are not operational during power up sequence, becoming operational when power up sequence is complete. Likewise, "setup" button, "option" button, "select" button, "next" button and "previous" button are operational during the power down sequence and not operational after the power down sequence.

A power light indicator 25 maybe included. In exemplary embodiments, the power light indicator 25 may display a green hue when power is applied to the display device 18, and displays a yellow hue when power is inadequate to maintain the performance of this device. A red hue is displayed when power is being disengaged, and when no power is being applied to the device 18.

A removable power source or cord (not shown) may be included and used to connect the housing unit 36 to a 110 VAC outlet, which outlet provides the power source for the display device 18. It will be understood by those skilled in the art that any conventionally known power source may be used including but not limited to a battery power source. By way of example, a network connection cable may be used. By using a network connection cable the display device 18 would be connected to a local area network order (not shown) to provide a means for bringing photographs stored on such a local area network into the operational sequence of the display device 18. To these ends, those of skill in the art would readily be able to interface the device 18 with any number of known hardware and software systems. Accordingly, further discussion regarding this connection has been omitted.

Figure 3:
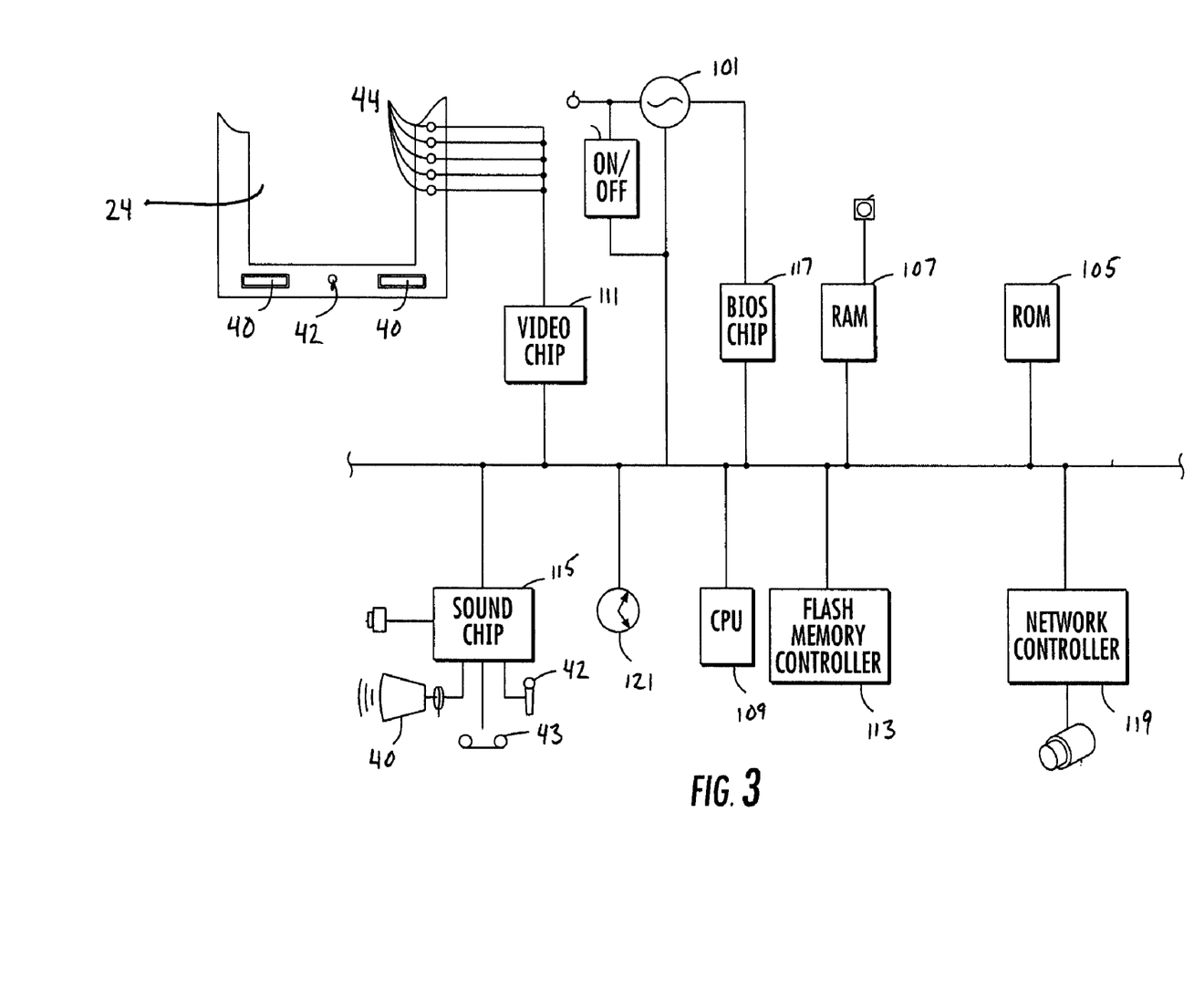
FIG. 3 is a schematic illustration of the operations of the digital display device constructed in accordance with an exemplary embodiment of the present invention.

Referring now to FIG. 3, a schematic illustration of the operations of the digital display device 18 constructed in accordance with an exemplary embodiment of the present invention is shown. As shown, computer bus 103, carries signals and information among and between a Central Processing Unit ("CPU") 109, a Random Access Memory ("RAM") 107, a Read Only Memory (ROM") 105, a video chip 111, a flash memory controller 113, a network controller 119 and the power source.

Computer Bus 103 is operable for carrying interrupt signals from the power source to a basic input/output system ("BIOS") 117, video chip 111 to CPU 109, or BIOS 117 to video chip 111, sound chip 115, and flash memory controller 113. ROM 105 holds pre-loaded operating software and pre-loaded network software. ROM 105 is volatile memory and holds status information concerning the apparatus of the present information comprising the current photograph and audio recording in process. RAM 107 is tested by BIOS 117 during the power on sequence. If there is an error, an appropriate message is displayed in the display screen 24. The RAM 107 is initialized by operating software after the power sequence is configured.

CPU 109 processes instructions which alter the behavior of the device 18. These instructions for CPU 109 are retrieved from the operating software and network software which both reside in ROM 105. Further, CPU 109 clears ROM 107, loads operating software ("OS"), loads network software ("NWT"), initializes RAM 107 and positions the apparatus of the present invention to frame 1 of the flash memory card. CPU 109 likewise runs the employed embodiment per pre-set parameters, moves frame 1 photo to video chip 111 buffer, moves frame 1 audio to sound chip 115 buffer and connects to local area network as needed. CPU 109 also detects power down signal, clears display screen 24, notifies flash memory controller 113 of shutdown and clears RAM 107. CPU 109 also sends signal to power supply 101 to complete power down.

Video chip 111 manages the state of display screen 24, receive signals from the user interface buttons 44 and passes signals which it handles to the CPU 109. Further, the video chip 111 responds to directions from instructions given to it by CPU 109. Video chip 111 checks status of display, and should errors exist, same are displayed by way of an error number in display screen 24. After power on sequence is complete, video chip 111 contains images for Electronic frame 1. Likewise, video chip 111 clears its buffers on the basis of CPU 109's signals.

Flash memory controller 113 manages the state of flash memory installed in a flash memory slot (not shown), and responds to directions from the instructions directed to it by CPU 109. Flash memory controller 113 is initialized by the power on sequence. It determines if a flash memory card is resident, and sends signals to CPU 109. Likewise, flash memory controller 113 permits writing to the flash memory chip, inhibits writing to the flash memory chip, and evicts same from the flash memory slot.

Sound chip 115 manages the state of the stereophonic speakers 40, the microphone 42 and an auxiliary recording input 43 in the event that same are necessary to receive alternate signals for audio processing. Sound chip 115 likewise receives signals from the user interface buttons 44 and passes signals which supersede that setup by the operator's prior instructions to CPU 109. Sound chip 115 further responds to directions from the instructions directed to it by CPU 109 and checks status of the microphone, speakers and auxiliary inputs. Sound chip 115 displays error messages in display screen 24 if are present and sends interrupt to CPU 109. After the power on sequence is complete, sound chip 115 contains the audio recording from frame 1.

BIOS 117 is another read only memory ROM with a specific function of handling the status of the RAM 107, ROM 105, and CPU 109. The BIOS 117, reports any unrecoverable information to the CPU for repair, as possible. Further, BIOS 117 performs the power up instructions, checks RAM 107, ROM 105 and CPU 109. Appropriate error messages are placed in display screen 24 by BIOS 117 and it determines if a flash memory chip is present, in addition to sending interrupt signals to video chip 111, and sound chip 115.

Network controller 119 provides connectivity to the local area network, receives signals from a network and handles appropriate signals, and other signals are sent to CPU 109 for handling. Network controller 119\ responds to direction from the instructions directed to it by CPU 109. Network controller 119 performs the power up sequence per instructions. Network controller 119 makes connections with local area networks, as needed—and notifies the CPU of status. In turn, timer 121, provides the ability to schedule process interrupts. Timer 121, is set to interrupt CPU 109 in a number of milliseconds, for which it has been set.

Likewise, it is apparent from the instant teachings, that the automatic cycling of digital still photographs according to the device and process shown operates without the need for network interface, and that in the embodiment using same, network functions and features are imported into the present invention as needed.

It will be appreciated by those skilled in the art that the operating software which includes a set of computer instructions stored on ROM 105, which when executed by the CPU 109 modify the behavior of the instructions being executed and the behavior of the apparatus of the present invention. Similarly, those skilled in the art will understand how network software another set of computer instructions stored on ROM 105 when executed by the CPU 109 modifies the behavior of the instruction stream being executed and likewise create the interactions with any attached local area network (not shown) in order to appropriately modify the behavior of the apparatus of the present invention.

Setup parameters are a list of options which the operator may use or modify to cause the display device 18 to alter its behavior including, but not limited to the manner which photographs are displayed in the associated audio recordings are played, for example, photograph sizing and shading techniques, time cycle for automatic rotation of displayed photographs, or the base levels of the speakers 40. The options are maintained in ROM 105 according to the present invention.

Likewise, it is understood that the setup parameters work in conjunction with a plurality of potential file formats, as known among conventional digital flash memory devices. The present invention may be used in conjunction with additional software, or additional or external ROM assistance to display file formats which have not been offered for consideration prior to the present invention. For example, the present invention may include means for reformatting images on the basis of such alternate file formats within departing from the scope of the instant teachings or the breadth of the claims appended hereto.

A setup menu sets all of the setup parameters (not shown). Said setup parameters are displayed for operator viewing and modification, on the display screen 24. The setup menu is caused to be displayed by pressing the setup button 44. Likewise, the operator may select and change any option at anytime, and it is further contemplated that one skilled in the art will realize that overriding of a set of instructions from a flash memory chip will occur when exercising the networking capability of the present invention.

In accordance with one exemplary embodiment of the present invention, the lenticular sheet 20 is fabricated by first designing a cutting tool, such as a stylus, with a desired lens shape. The cutting tool is preferably made of a diamond or carbide, however, it will be understood by those skilled in the art that any hard material suitable for engraving cylinders may be used. The shape of the cutting tool is dictated by the desired visual effect, however, in order to provide a higher clarity, a first radius is formed on either side of the distal end of the cutting tool and then a second, larger, radius is formed on the tip of the cutting tool.

Once the cutting tool is designed, the inverse lens shape is engraved into pre-selected portions of a flat plate or cylinder using any known, conventional method of engraving, thereby forming a plurality of inverse lens arrays or patterns. Preferably, the engraving processing includes the use of a computer operable for directing the cutting tool in both direction and depth such that an optimal lens pattern can be transferred into the plate or cylinder. Advantageously, by using the engraving process for the plate or cylinder, a variety of inverse lens patterns can be engraved into the plate or cylinder, thereby providing a variety of lens patterns cast on the same sheet, including but without limitation, lens patterns having different shapes and lens patterns extending in different directions such as longitudinally and latitudinally from a certain axis.

Subsequent to engraving the plate or cylinder, the plate or cylinder is placed into the lenticular system or process of manufacture. The inverse lens pattern is then transferred to a sheet material using known conventional casting methods, thereby forming the lens pattern on the sheet in the desired areas only. Preferably, the sheet material is plastic. Further, it will be appreciated by those skilled in the art, that a variety of plastics can be employed, for example and without limitation, acrylics, polystyrenes, polycarbonates, polyesters, polyolefin's, polyvinyl chlorides and all such polymeric equivalent materials.

Subsequent to the casting of the resulting lenticular sheet 20, the sheet 20 is formed into a shape such that the size of the sheet corresponds to the dimensions of the digital screen 24 and so that lenticules 30 of the sheet are angled to correspond to the pixel size and pitch values of the digital display device 18. In exemplary embodiments, the lenticular sheet 20 is shaped to the size of the display screen 24 by any conventional means, including but not limited to rotor cutting, press cutting, stamping, or the like. The lenticular sheet 20 is then removably attached to the display screen 24 such that the resized, interlaced two dimensional image 14 may transmitted to the display device 18 from the computing device 16 or memory device and projected on the display device 18 for viewing in three dimensions through the lenticular sheet 20. Attachment of the lenticular sheet 20 to the display device 18 may be by any conventional means, but is preferably performed by a frame incorporating corner type angles or the like. In other exemplary embodiments, the sheet 20 may be integrally formed or attached to the display device 18, for example where its intended use is for advertisement only. In yet another embodiment, the lenticular sheet 20 may be the screen of the display device 18.

Referring now to the drawings, FIG. 3 is a perspective view of a portion of a lenticular sheet 20. The sheet 20 is provided with a lens elements 100 that are cylindrical lenses with a circular cross section. The width of each lens is D. The lenticular sheet consists of a dielectric medium 102 with multiple convex lenses 100 formed on a viewer side. The dielectric medium 102 may be any transparent material, but is typically a clear plastic having good mechanical properties. The planar side of the array 104 contains a printed image that is commonly designed using a computer to be addressed by the sheet 20 and variation in a viewer's angle of regard.

Figure 4:
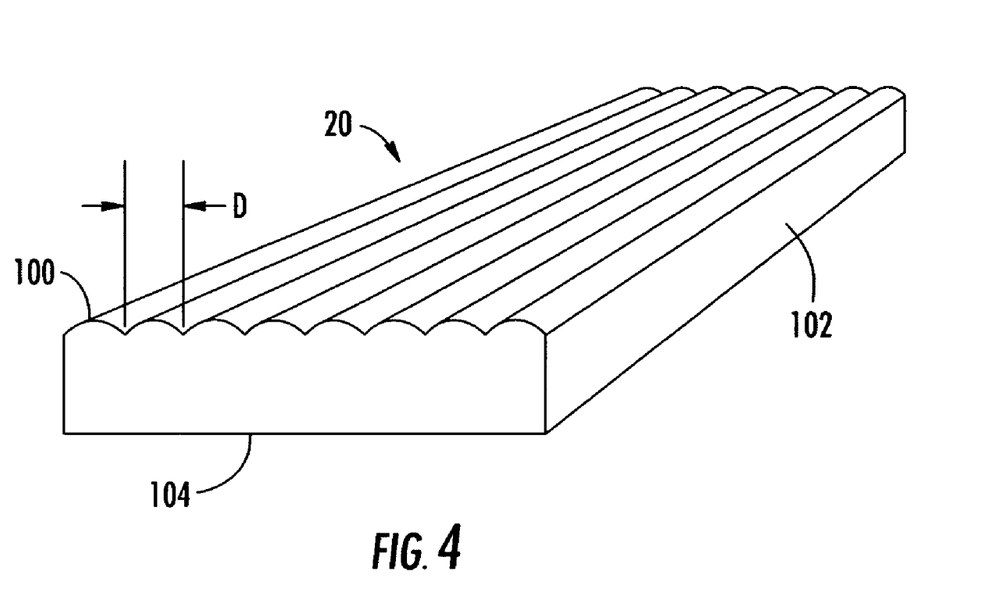
FIG. 4 is a perspective view of a portion of a lenticular sheet produced in accordance with the method of the present invention and operable for use with the system of the present invention.
Figure 5:
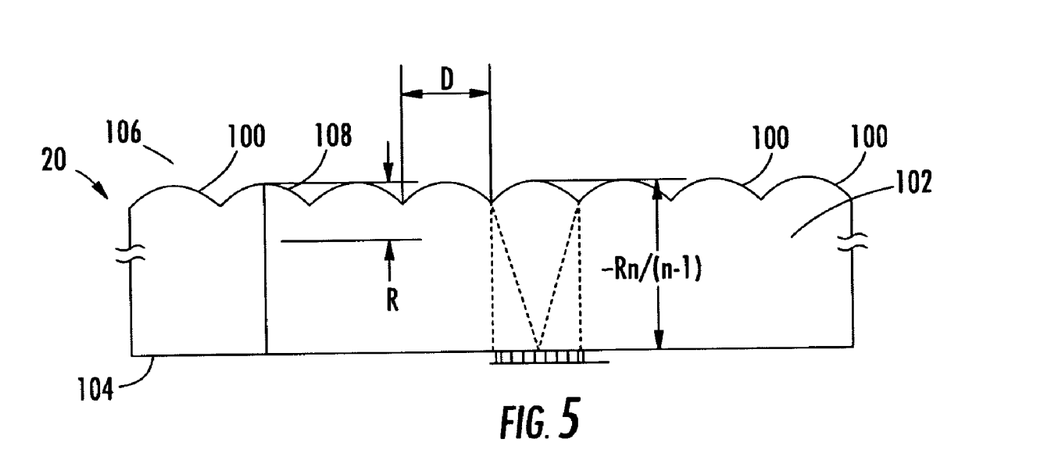
FIG. 5 is a cross-sectional view of the lenticular sheet shown in FIG. 4.
Figure 6:
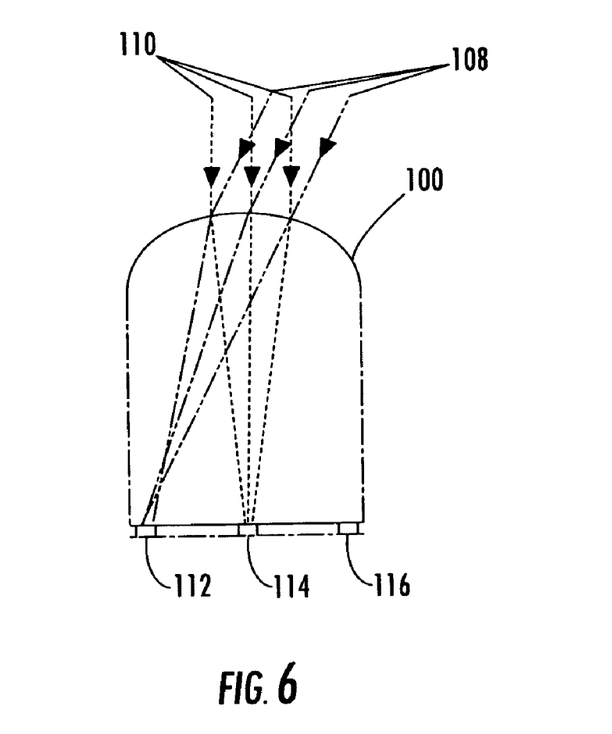
FIG. 6 is a cross-sectional view of a lens element of the lenticular sheet shown in FIG. 4.

FIG. 4 is a cross-sectional view of the lenticular sheet 20 shown in FIG. 3. The sheet 20 has dimensions MD×ND×~nR/(n−1) where D is the width of a lens element 100 as best shown in FIG. 5, n is the index of refraction of the plastic material, R is the radius of the lens element 100 and R<D/2. M and N are product variables. In one example, an image may be presented, wherein M and N may be on the order of 50 to 100 or more. The actual dimension D depends on the design viewing distance and quality objectives. In exemplary embodiments, the actual dimension D is calculated by the following subtracting the thickness of the surface of the display device from the focal point of the lenticular sheet 20. In exemplary embodiments, the thickness is on the order of 250 mils.

The transparent material is commonly formed as a sheet with a lens array formed on the entirety of a front side 106, or a viewer side. The backside 104, or flat side, is considered a non-viewer side. The radius of the substantially circular cross section, R, is shown larger than the lens spacing D. The overall thickness of the array is:

$$\text{Thickness} \sim R \times n/(n-1)$$

where n is an index of refraction for the dielectric medium. The backside 104 is removably attached to a display device such that the lenticular sheet is aligned with the viewing portion of the display device.

The viewing angle of the lenticular sheet 20 and utilized by the present invention is determined by the following formulation:

$$\text{Angle} = 2 \text{ arc Tan } W/(2J/n)$$

where W is the lens width, J is the focal point, calculated from the radius and n is the index of refraction. For 3D images the viewing angle is inversely proportional to the amount of virtual depth that can be created with a lenticular lens. A larger viewing angle will provide less virtual depth and a smaller viewing angle will provide more virtual depth. Virtual depth is defined as the perceived distance either into or out of the viewing plane. The angle is substantially equal to the distance you would have to move for one image to flip to another. The smaller the number, the quicker the flip and the more suitable for 3D which has a number of images of the same scene from a slightly different angle.

FIG. 5 is a cross-sectional view of the lens element 100 of the lenticular sheet 20 shown in FIG. 2. Since the viewer's eye is on the order of 4,000 times the radius of the lens cross section, an individual lens can be analyzed with negligible error by assuming that light rays at a first angle 108 and light rays at a second angle 110 are parallel. The lens 100 focuses the rays from a repertoire of angles onto a repertoire of printed regions. The light rays from the first angle 108 focus on a printed region 112. From symmetry, light rays at an angle that is negative with respect to a perpendicular to the sheet 20, if the angle 108 is defined as positive, focus on an area 114 that is mirrored from the centerline of the lens 100. Light rays from the second angle 110 focuses on and therefore select a second, independent area 116. If the repertoire of images has a defined number, the lens 100 must be capable of adequately focusing on a same number of independent areas. The actual repertoire of angles need not be a linear progression. If one marks off the projection of the lens 100 on the surface 104 in q centers where q is the number of images in the repertoire and then calculates the corresponding angles of regard, parallel rays at these angles must focus in a reasonably non-overlapping fashion on the surface at the best image plane compromise available. Non-compensated lenses will typically depart from the ideal. A measure of the quality of a lens is the standard deviation of a point from a spread of points that intersect the lens. If the standard deviation is such that focus areas overrun adjacent focus areas, the images seen will not be well defined in color and especially definition.

The display device 18 is preferably a digital photographic display device. However, it is understood that the display device may be any known display device known in the art, including, but not limited to CRTs, LEDs, LCDs, LCD projectors, plasma displays, and other devices. Flat screen display devices are preferred for ease in applying the lenticular sheet 20. When coupled to a display system, the lenticular sheet 20 focuses the pixel array at the cylinder-shape lens array focal plane. The lenticular sheet 20 refracts the light from the pixel array so viewers observing the images through the lenticular sheet see different images based on their angular position.

The exemplary embodiments of the present invention are operable for presenting a desired three dimensional visual effect that serves as a significant improvement over the above described prior art methods and systems. In addition, the exemplary embodiments of the present invention have multiple uses and benefits in various industries. It will be apparent to those skilled in the art that various modifications and variations can be made to the present invention without departing from the spirit and scope of the invention. Thus, it is intended that the present invention cover all conceivable modifications and variations of this invention, provided those alternative embodiments come within the scope of the appended claims and their equivalents.

What is claimed:

1. A method of producing and displaying at least one three dimensional image on a digital photograph display device, said method comprising:
   providing a digital display device having a display area and a lenticular screen coupled thereto;
   providing a plurality of digital images;
   interlacing said plurality of digital images to form at least one interlaced image which corresponds to the size and pitch of the lenticular screen and the digital display device;
   transmitting the at least one interlaced image to the digital display device;
   displaying the at least one interlaced image with the display device through the display area and the lenticular screen;
   wherein said lenticular screen comprises a plurality of diagonally positioned lenticules to correspond to the pixel size and pitch of the display area.

2. The method according to claim 1, wherein the at least one interlaced image further comprises a series of three dimensional digital interlaced images.

3. The method of claim 1, wherein displaying said at least one interlaced image through the display area and the lenticular screen creates a three dimensional image visual effect.

4. The method according to claim 1, wherein the at least one interlaced image further comprises a three dimensional digital video.

5. The method of claim 1, wherein the lenticular screen is produced by a method comprising the steps of:
   providing a substrate of transparent material having a first side and a second side and an index of refraction greater than one;
   forming a plurality of lenses on the first side of the substrate; and
   shaping the substrate to correspond to the display area of the display device,
   wherein the plurality of lenses are angled to correspond to the pixel size and pitch of the display area.

6. The method of claim 5, wherein the step of forming the plurality of lenses further comprises the steps of:
   creating as cutting tool;
   engraving a plate with cutting tool to form an inverse lens pattern in pre-selected areas;
   using the engraved plate in an casting process such that the substrate can be cast with the lens pattern.

7. The method of claim 5, wherein the step of forming the plurality of lenses further comprises the steps of:
   creating as cutting tool;
   engraving a cylinder with cutting tool to form an inverse lens pattern in pre-selected areas;
   using the engraved plate in an casting process such that the substrate can be cast with the lens pattern.

8. The method of claim 6, wherein the step of engraving the plate further comprises the steps of:
   utilizing a computer to control and direct the direction and depth of the engraved lens pattern.

9. A method of producing and displaying at least one three dimensional image on a digital display device, said method comprising the steps of:
   providing a digital display device comprising a housing unit having a display screen for displaying interlaced images, electronic circuitry located in the housing unit and connected to the display screen for receiving digital photograph data and supplying the same to the display screen, and a lenticular sheet removably attached to the display screen operable for allowing the digital photograph data to be viewed in three dimensions, the lenticular sheet comprising a plurality of lenticules and having a configuration which corresponds to the pixel size and pitch of the display screen, said plurality of lenticules being diagonally positioned to the display screen;
   providing a plurality of digital images;
   interlacing said plurality of digital images to form a at least one interlaced image;
   transmitting the at least one interlaced image to the digital display device;
   displaying the at least one interlaced image with the display device, through the display area and the lenticular screen.

10. The method according to claim 9, wherein the at least one interlaced image further comprises a series of three dimensional digital interlaced images.

11. The method of claim 9, wherein displaying said at least one interlaced image through the display area and the lenticular screen creates a three dimensional image visual effect.

12. The method according to claim 9, wherein the at least one interlaced image further comprises a three dimensional digital video.

13. The method of claim 9, wherein the lenticular screen is produced by a method comprising the steps of:
   providing a substrate of transparent material having a first side and a second side and an index of refraction greater than one;
   forming a plurality of lenses on the first side of the substrate; and
   shaping the substrate to correspond to the display area of the display device,
   wherein the plurality of lenses are angled to correspond to the pixel size and pitch of the display area.

14. The method of claim 13, wherein the step of forming the plurality of lenses further comprises the steps of:
   creating as cutting tool;
   engraving a plate with cutting tool to form an inverse lens pattern in pre-selected areas;
   using the engraved plate in an casting process such that the substrate can be cast with the lens pattern.

15. The method of claim 13, wherein the step of forming the plurality of lenses further comprises the steps of:
   creating as cutting tool;
   engraving a cylinder with cutting tool to form an inverse lens pattern in pre-selected areas;
   using the engraved plate in an casting process such that the substrate can be cast with the lens pattern.

16. The method of claim 14, wherein the step of engraving the plate further comprises the steps of:
   utilizing a computer to control and direct the direction and depth of the engraved lens pattern.

* * * * *